May 10, 1966  J. W. HENRY ETAL  3,250,537
POLYMER RECORD
Filed Aug. 29, 1962                              3 Sheets-Sheet 1
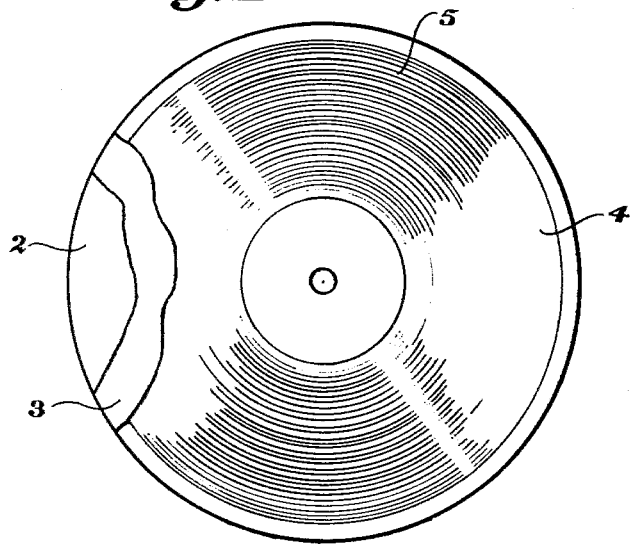
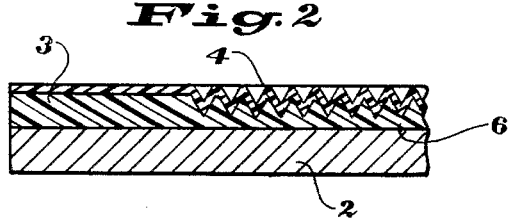
James W. Henry
William D. Kennedy
INVENTORS
BY R. Frank Smith
Harold M. Powell
ATTORNEYS May 10, 1966 J. W. HENRY ET AL 3,250,537
POLYMER RECORD
Filed Aug. 29, 1962 3 Sheets-Sheet 2
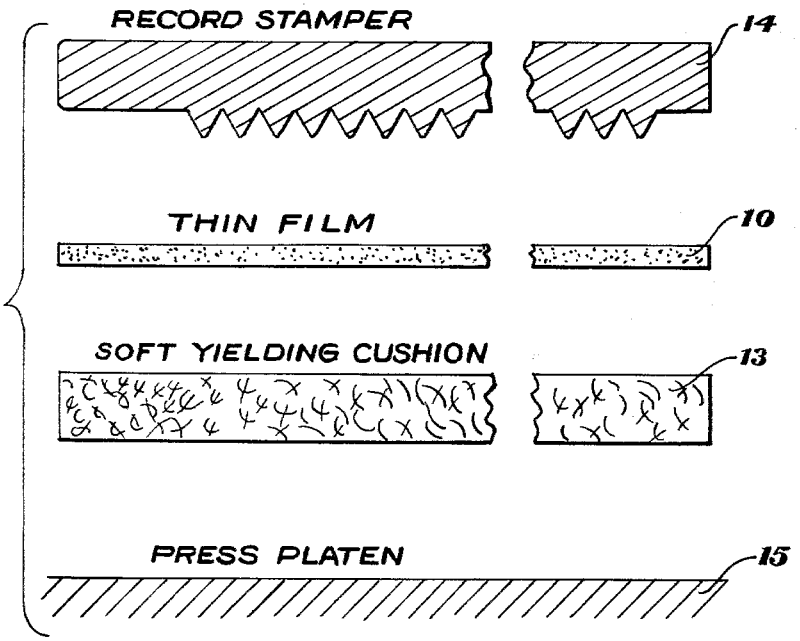
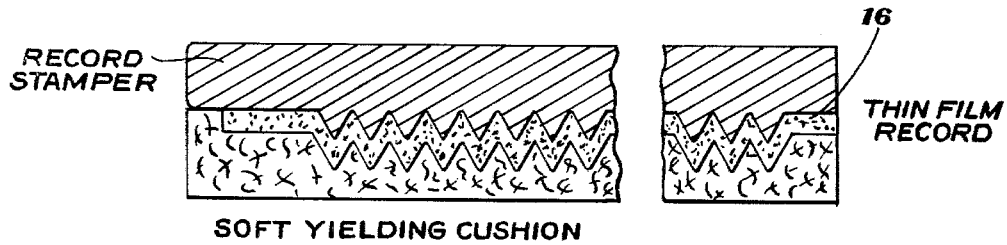
James W. Henry
William D. Kennedy
INVENTORS
BY R. Frank Smith
Harold M. Powell
ATTORNEYS

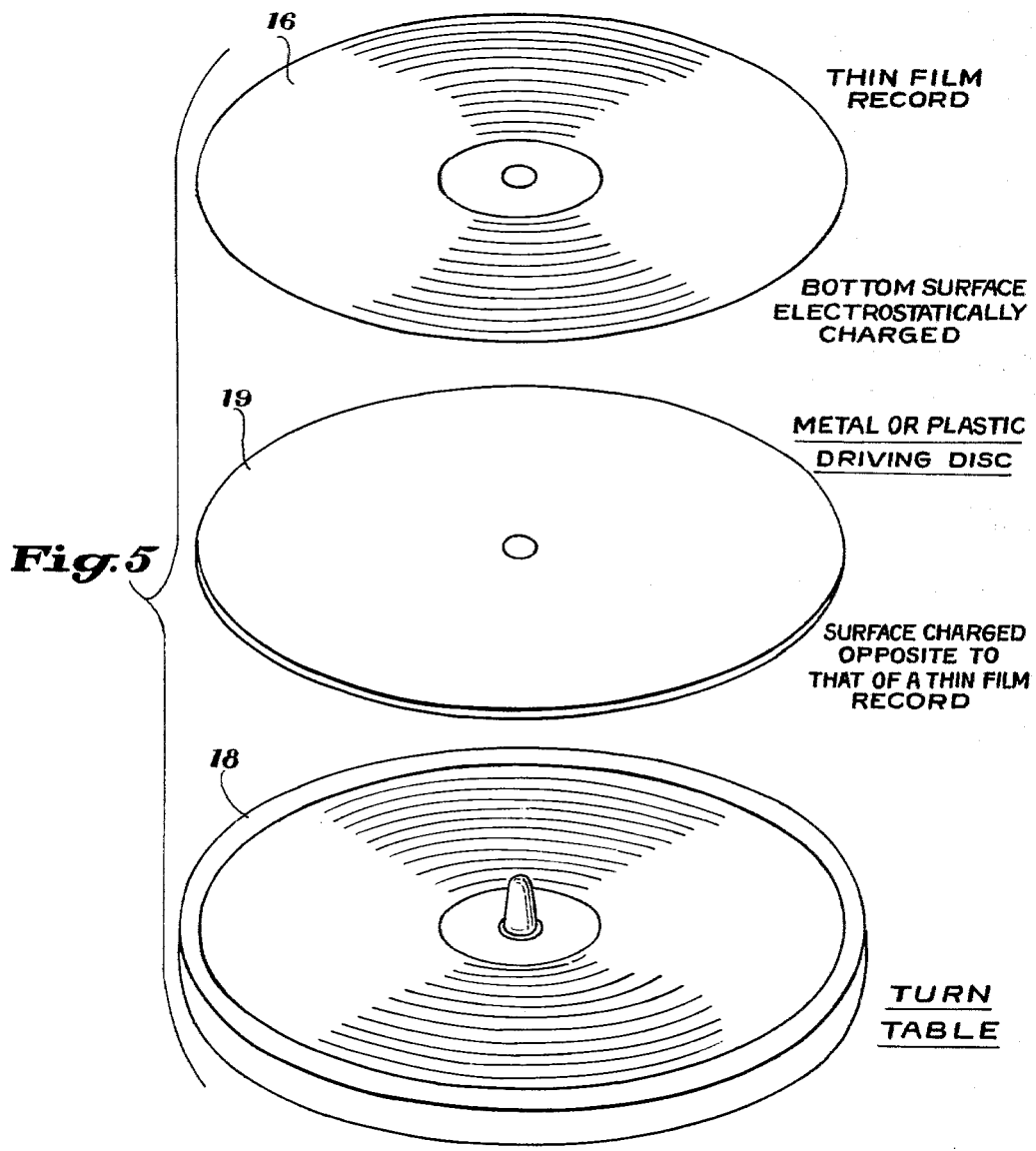

3,250,537
POLYMER RECORD
James William Henry and William Dempsey Kennedy, Kingsport, Tenn., assignors to Eastman Kodak Company, Rochester, N.Y., a corporation of New Jersey
Filed Aug. 29, 1962, Ser. No. 220,340
The portion of the term of the patent subsequent to July 7, 1981, has been disclaimed
5 Claims. (Cl. 274—42)

Certain of the following material has been disclosed in our parent application Serial No. 151,559, now Patent No. 3,140,095, of which the present application is a continuation-in-part.

This invention concerns a novel type record. More particularly this invention concerns a special polymer record and laminate combination thereof.

As is known, conventional phonograph records are pressed by means of a compression molding process from compounds of polyvinyl chloride or polystyrene. In the case of the polystyrene resin they are also injection molded. In an effort to reduce the cost of records some manufacturers have turned to laminating films of polyvinylchloride or cellulose acetate to a paper support so that the plastic surface acts as a wearing and detail retaining surface to carry the phonographic etching which is impressed upon the surface by means of a metal negative replica of the original recording. This metal replica is called by the trade a "stamper." Records which have heretofore been prepared by laminating cellulose acetate or polyvinyl chloride to a paper base are generally characterized by poor surface wearing properties and high noise level which appears to be caused by the inability of the laminated surface to conform exactly to the groove structure of the stamper.

In view of the current interest in reasonably good quality reproducing in records, it is believed apparent that the development of a record which will have low noise level and otherwise provides more faithful reproduction but still is of relatively low cost represents a highly desirable result. After extended investigation and tests, we have discovered such a record which may not only be used in conventional ways but which lends itself to a variety of new manners of use which will be apparent from the description which follows.

This invention has for one object to provide a novel polymer type record wherein provision is made for the sound groove carrying surface to more readily assume the groove configuration supplied by the stamper or similar forming member. Another object is to provide a record of the type aforesaid wherein by a special combination of plastic components, wearability is secured in combination with low noise level and other benefits. Still another object is to provide a record made of a special combination of support, intermediate polyolefin plastic and polyester surface plastic. Still a further object is to provide a record which may be used in a number of ways apart from conventional use. Another object is to provide a new way of making or stamping records. Other objects will appear hereinafter.

In the broader aspects of working out our invention, we have made experiments relating to the wear properties of polymeric materials when applied to phonograph records constructions which have led us to the conviction that a satisfactory record can be prepared using a thin skin of certain polymeric materials having excellent wear properties. In further detail, we have discovered that, surprisingly, satisfactory phonograph records may be made using a polyester layer alone. The result of this discovery has been that the phonograph record can be reduced to a thickness of less than .001". We have also discovered that the difficulties which would be expected in playing this record are nonexistent due to certain properties which are present in the records made according to the principles embodied in our discovery as set forth herein.

Records made according to the principles discovered and developed by us differ from thin-film phonograph records which have been made in the past by other workers. Earlier attempts by other workers to produce thin-film phonograph records have required that the thin-film record be molded of the plastic film which comprises the record.

In the instant invention, we distinguish between molding as practiced in the prior art, and forming, drawing, or folding, which is a novel feature of this invention as related to phonograph records. In molding, flow of material is inherent, such that local changes in thickness take place. In the prior art, the thin plastic blank has been caused to undergo flow, locally, so that the cross-section thickness varies from point to point. In the present invention, the thin film is caused to deform to fit the contours of the stamper without substantial change of cross-section thickness, locally. Among other advantages of avoiding flow is the greatly increased life of the record stamper.

Because earlier workers anticipated difficulties in the record lying flat on the turntable, they used fairly thick films which would have the required stiffness and weight to lie flat on the table. Materials which were found by other workers to be useful in making such records were polyvinyl chloride resins, polyvinyl acetate resins, cellulose acetate, and cellulose acetate butyrate resins as already mentioned above.

We have found that thin-film records of the present invention do not experience difficulty in wrinkling or other deformations while resting on the turntable if the film which comprises the record is thin enough. We have found that this thickness may be as thin as .0005". Thinner materials than this will rest in a flat position on the turntable, but the film is so thin that some risk may be encountered that the stylus of the playing cartridge will break through the thin film.

We have also discovered that molding of the film to conform to the groove structure of the stamping die is not necessary. Satisfactory records may be produced by a technique in which the film is drawn or folded over the grooves of the stamper using heat and pressure. We have found that film materials which have been previously oriented in their molecular structure by stretching the film may be permanently set in the shape of the groove structure by raising the temperature of the material above a critical point and then cooling the material in intimate contact with the stamping die. In working out the mechanical details of this forming process, we have developed a record-stamping process which differs greatly from that used by earlier workers who made thin-film records and as will be described in greater detail in connection with the drawings forming a part of this application.

Because our thin-film records are made by forming the material over the stamping die using a drawing or folding principle, support by a plane surface is not desirable. Instead we have found that a soft-yielding surface which will flow under pressure to force the thin-film materials into the grooves of the stamper is required. When such a material is used to back up the thin plastic film to the stamping die, the film is forced into intimate contact with the die. We have found that this principle may be used to form even the thick thermoplastic films used by earlier workers. Records made in this way are satisfactory in playing properties but lack the durability which is inherent in records prepared of oriented and heat-set films where the heat-setting is done with the material in intimate contact with the record-stamping die. Since a plane support surface is not used in our processs, the alignment of the stamping press, a source of great difficulty in the manufacture of thin-film records, is not critical. The soft-yielding cushion, which is used to back up the film material to provide intimate contact with the stamping die, provides a compensating pressure pad which overcomes the difficulties introduced into stamping operation by minor misalignment of the stamping press.

In a further embodiment of our invention, we contemplate a structure consisting of the wear resistant material above described having an exceedingly thin cross-section (of the order of less than one-half thousandth of an inch thickness) combined with a thicker soft material which also acts as an adhesive to bind the sandwich together and also as a soft material which would take the form of the groove structure. The physical properties of the wear resistant material are such that the thin film of material would deform suitably to reproduce the groove structure with the softer underlying material flowing to thinner or thicker dimension as required to reproduce the groove structure impressed in it by the record stamper. A paper base or the like may be used as a means of increasing the thickness of the complete record if this is desired.

We have found that records made according to the principles just set forth play with a quality of sound output which may be classed as "high fidelity."

Cost of the product is markedly reduced while retaining the performance of a more expensive molded product. The thin wearing surface is low in per unit cost because the quantity required per unit is small. The softer material which is used as a core in this record embodiment and conforming material in certain of our embodiments is less costly and thus may be made thicker without unduly increasing costs. The properties of the yielding core material may be adjusted for more perfect performance without any restraints being imposed on the application due to poor wearing properties of the material. A support or base material, if such is desired, may be of paper, which may be purchased at low cost compared with making the entire record of molded plastic.

For more complete understanding of our invention, reference is made to the attached drawings forming a part of this application.

FIGURE 1 is a top view, with portions broken away, showing a laminated record construction in accordance with one embodiment of the present invention.

FIGURE 2 is a sectional view at some random point in the record of FIGURE 1, said view being on an enlarged scale, further illustrating the laminated construction.

FIGURE 3 is a semi-diagrammatic side elevation, exploded view, illustrating the fabrication of the thin record embodiment of the present invention.

FIGURE 4 is a somewhat similar diagrammatic side elevation view showing the components of FIGURE 3 in closed position and illustrating that the thin film record thus produced is of uniform thickness free of thin areas.

FIGURE 5 is an exploded side elevation view illustrating use of a thin film record of the present invention.

Referring to FIGURE 1, 2 represents a suitable base material as cardboard or other heavy paper. At 3 is shown the softer core material, such as polyolefin plastic. Positioned thereover is the wearing plastic surface 4, the chemical composition of which will be explained in greater detail hereinafter and which surface carries the sound grooves 5.

Referring to FIGURE 2, this cross-sectional view illustrates diagrammatically that the wear layer 4 is relatively thin as within the range of 0.2 to 3.0 thousandths of an inch. The softer intermediate layer 3 will be thicker as will be apparent from the examples which follow and may be within the range of 1.0 to 10.0 mils. Likewise, the support or base material 2 may be thicker and the particular thickness may be as desired. Such base material bonds to the plastic layer as at the interface 6.

Referring to FIGURE 3, 10 represents the thin polymeric film of the present invention which is to be formed into a record. A soft material is represented by 13. A record stamper is shown at 14 and a platen at 15. When these parts are pressed together as indicated in FIGURE 4, the thin film record formed still conforms in thickness dimension to the original sheet. Hence, the record is free of strained, weak zones.

Referring to FIGURE 4, this illustrates the situation when the thin film or sheet 10 has been firmly pressed between the stamper and the cushion. As apparent from FIGURE 4, the resultant thin film record 16 readily conforms to the contour of the stamper without material reduction in thickness of the thin sheet. In other words, the thin sheet is folded into the record configuration without substantial distortion of sheet thickness.

Referring now to FIGURE 5, the complete single layer thin record 16 is the product as produced by the operations in accordance with FIGURES 3 and 4. This record may be played as is on a turntable, as will be discussed hereinafter. However, where the surface of the turntable 18 of FIGURE 5 is corrugated or otherwise not specially smooth, we would provide a metal or plastic disc 19. This disc may be surface charged in any conventional manner with a charge opposite that of a charge placed upon the bottom of record 16 of FIGURE 5.

The preferred wearing material for forming the phonograph record prepared according to this invention are the polyesters and copolyesters prepared from 1,4-cyclohexanedimethanol and described in more detail in U.S. Patent 2,901,466. Particularly useful is the copolyester obtained by reacting 0.83 mole of dimethyl terephthalate, 0.17 mole of dimethyl isophthalate and at least 1.0 mole of 1,4-cyclohexanedimethanol. The unmodified poly-(1,4-cyclohexylenedimethylene terephthalate) is also useful in this invention. Other modified poly(1,4-cyclohexylenedimethylene terephthalates) are also useful where the modifying diacid amounts to less than about 50 mole percent of the total diacid. Such diacids as phthalic, isophthalic, suberic, succinic, pimelic, or suberic acid or their esters may be used.

Poly(ethylene terephthalates) may also be used for the outer skin in the application of this invention. Other polyesters such as those obtained from 4,4-sulfonyldibenzoic acid or its esters and glycols such as 1,5-pentanediol, 1,6-hexanediol, and the like may be used in the practice of this invention. Polyesters obtained from 2,6- or 1,5-naphthalene dicarboxylic acid and ethylene glycol, and the like are also utilizable. Poly(amide-esters) are also adaptable. Combinations of poly(1,4-cyclohexylenedimethylene terephthalate) with 1,4-cyclohexanedimethanol and 4-(aminomethyl)cyclohexanemethanol where the latter ranges form 0–50 mole percent of the total combined acids are utilizable.

Polyamides such as 6,6 nylon, 6,10 nylon, and 6 nylon are utilizable. Polyamides from pimelic and suberic acids with 1,4-cyclohexanebis(methylamine) also can be used. Polycarbonates such as are prepared from Bisphenol A prove utilizable as a wearing surface for records constructed according to the embodiment of this invention where the wear-layer is backed up with a polyolefin layer, for example.

Homopolymers of ethylene, propylene, and other olefins, when suitably processed, may be used in some instances as the wearing surface for records constructed according to this invention. Copolymers of the olefins may also be used. By suitable treatment, polyvinyl chloride resins may be used as the wearing surface for such records. Other polymers, such as polymethyl methacrylate, may be used when the films formed of such materials are treated to provide the required physical properties so that the thin skin so formed is such that it will conform to the groove structure impressed in the record laminating material.

In addition to films which may be formed by the condensation polymers, films which are formed by addition polymerization may be employed to some extent. Copolymers of methyl acrylate and acrylonitrile as well as homopolymers of the acrylates such as butyl and ethyl acrylate are illustrative of these products which may be used. However, as indicated above, for best results we prefer to employ the polyester film first referred to.

Therefore, in summary the choice of material to be used for the thin wearing surface of the record is indicated by abrasion resistance of the material and its ability to conform to the groove structure which is impressed into the sub or conforming layer of soft material by the metal stamper.

The soft sub or conforming layer which is used in the sandwich which forms the record groove bearing material for records constructed according to the embodiment of FIGURE 2 this invention may be of material which is easily formed by heat and pressure or other mechanical means to the shape of the groove structure borne on the metal stamping plate. Our preferred material is polyethylene, though homopolymers of propylene or other olefins may be employed in this application. Copolymers of butene and propylene also offer materials suitable for this use. Plasticized polyvinyl chloride resins may be used in this application and specially treated polymers such as polystyrene or polymethyl methacrylate may be used.

A further understanding of our invention will be had from a consideration of the further description and particularly the examples which follow for illustrating certain of our preferred embodiments.

*Example I*

In this example, which is in accordance with FIGURES 1 and 2, we have used a construction in which a paper base having a thickness of twenty thousandths of an inch is laminated to a polyester film having a thickness of one half thousandth of an inch. The polyester film is used as the wearing surface. A core consisting of one thousandth inch thickness of polyethylene film is used to bind the paper and polyester film together as well as to provide a soft and easily flowed material to conform to the groove structure of the record stamper. Successful pressuring of this material was accomplished at pressures ranging from 750 pounds per square inch to 2200 pounds per square inch which happened to be the limit of the press. Temperatures at which the flow of the core material was sufficient to provide excellent conformity to the groove forming stamper ranged from 100 degrees centigrade to 150 degrees centigrade.

When discs which had been prepared in this manner were played using a standard commercial phonograph with sapphire stylus, the sound quality which resulted from the playing was judged commercially satisfactory by a panel of impartial listeners. By commercially satisfactory, is meant that the sound was crisp and yet fully rounded as far as frequency range is concerned. Several of the listeners commented that the quality of sound from this type of record was equal to and perhaps better than that of certain polystyrene discs which have been injection molded.

This example illustrates the embodiment of the present invention as follows: To produce a long wearing record having high-fidelity sound a thin skin of hard wearing material which provides the surface upon which the stylus rides is provided. Under this thin skin we provide a softer and more conforming layer of plastic material which supports the thin skin and deforms in the molding or stamping process to conform to the groove structure to be placed on the record. By making the hard wearing surface thin, we are able to cause it to deform sufficiently so that it flows smoothly over the underlying conforming layer without wrinkling. We have found that the material which forms the outer wearing skin should be one which is capable of being formed over the conforming layer. If this layer is not capable of flowing over the under conforming layer and breaks due to this deformation, the record will be noisy and unsatisfactory.

While in this illustrative example the base or support material was of paper, we can make configurations in which the base is metal, plastic, glass, or wood, or composition boards. The purpose of the base is primarily that of a support and does not enter into the sound producing portions of the record of this invention.

We have made life tests of records which have been prepared according to the embodiment of FIGURES 1 and 2 and these tests show that the life of such a record using a polyester wearing film as the outer surface [a material such as poly(1,4-cyclohexylenedimethylene terephthalate)] can be played in excess of 2,000 playings without visible or audible effect upon the performance of the record.

*Example II*

In accordance with this example, the laminate construction was generally the same as in Example I. However, on the paper base the soft layer was comprised of polyethylene and the wearing layer was comprised of polyethylene terephthalate. The sound grooves were stamped into the record as described under the preceding example. Although the record of this example compared satisfactorily to prior art records of somewhat higher cost, the record of this example was not as good as the preferred combination of the preceding example.

*Example III*

In accordance with this example, our laminated record was made of the following combinations:

(1) 19 point milk carton board (coated on both sides by extrusion of polyethylene), 0.001" poly(1,4-cyclohexylenedimethylene terephthalate) (extrusion coated on one side with one thousandth of an inch of low molecular weight polyethylene).
(2) 20 point chip board, four thousandths of an inch of polyethylene sheeting, one thousandth of an inch of poly(1,4-cyclohexylenedimethylene terephthalate) extrusion coated with 0.001" of low molecular weight polyethylene.
(3) 18 point chrom-coat box board, extrusion coated with polyethylene wax (Eastman Epolene C), thickness 4 mils., 0.001" poly(1,4-cyclohexylenedimethylene terephthalate) coated with 0.001" low molecular weight polyethylene.
(4) 19 point milk carton board, extrusion coated both sides with polyethylene, 0.0005 inch of poly(1,4-cyclohexylenedimethylene terephthalate) coated with 0.001" of low molecular weight polyethylene.
(5) 19 point milk carton board, extrusion coated both sides with polyethylene, 0.0005 inch polyethylene terephthalate coated with 0.001" low molecular weight polyethylene.

The sound grooves were pressed into the surface by the following steps:

(1) The sandwich was assembled for combination (1) and placed in a hydraulic press under 500 p.s.i. pressure. Heat was applied to the sandwich under this pressure by means of steam heated platens. The platens were preheated to 100° C. prior to insertion of the assembled sandwich in the press. The pressure was raised to 2100 p.s.i. and held until cooling water circulating through the platens of the press had cooled the sandwich to room temperature. Subsequent experiments were carried out at temperatures of 110° C., 120° C., 130° C., 140° C., 150° C., and 160° C. This last temperature was the limit which was available from the steam heating system of the press which was used. Subsequent experiments were carried out at each of the above stated temperatures and the pressure placed on the sandwich during the cooling cycle was modified. Experiments were carried out at each of the following temperatures and pressures.

100° C.: 750, 1000, 1250, 1500, 2000, 2100 p.s.i.
120° C.: 750, 1000, 1250, 1500, 2000, 2100 p.s.i.
130° C.: 750, 1000, 1250, 1500, 2000, 2100 p.s.i.
140° C.: 750, 1000, 1250, 1500, 2000, 2100 p.s.i.
150° C.: 750, 1000, 1250, 1500, 2000, 2100 p.s.i.
160° C.: 750, 1000, 1250, 1500, 2000, 2100 p.s.i.

All of the combinations of materials cited were tested under these conditions. Tests of these records indicated the following:

Records pressed at 100° C. and 750 p.s.i. were not satisfactory in the outermost grooves because of imperfect forming of the materials. The quality of the sound pressed into the materials under these conditions was not perfect, lacking in delicate detail. As the pressures of pressing were raised, the quality of the sound record was improved.

Records pressed at 160° C. and 2100 p.s.i. pressure were perfect in reproduction of the stamper but suffered occasional rupture of the paper supporting base. Records pressed at 120° C. and 2100 p.s.i. were satisfactory in quality. In general, pressure may be exchanged for temperature above 120° C. to provide the quality of impression which is desired.

Records pressed at high temperature and high pressure tend to produce more perfect replicas of the stamper details. As pressure is lowered conformation of the sandwich material to the stamper is lowered. Increasing temperature improves the conformation of the sandwich material to the stamper.

Sound quality of the records produced by the above described techniques is a function of the pressure and temperature at which the sandwich is pressed. Higher fidelity is achieved at high (2100 p.s.i.) pressures and temperatures above 120° C. Within the rupture limits of the paper base raising the temperature of the sandwich during the pressing operation increases the quality of the record. In general, excellent sound quality may be attained at temperatures 120° C. and above, and pressures in excess of 1500 p.s.i. At higher temperatures the pressure may be lowered to 750 p.s.i. with retention of the sound quality of the record.

*Example IV*

In accordance with this example a thin sheet of the wearing material alone, and free of a polyolefin or the like layer, is positioned between the stamper and a cushion. In other words, as shown in FIG. 3, a thin sheet 10 was placed between the forming parts 13 and 14.

In this example a thin sheet was of a polyester composition as described above. In particular, a polymer as derived from terephthalic acid or dimethyl terephthalate and cyclohexanedimethanol gives the preferred composition of the sheeting as already discussed above.

The several parts are pressed together as shown in FIG. 4.

We have found that the control of the temperatures at which the thin-film records are pressed is an important part of the practice of this embodiment of our invention. While satisfactory records may be prepared when the materials are formed above temperatures of 100° C. superior records may be prepared when the temperature of the materials is raised above the heat distortion temperature of the material. At this point the surface of the material becomes plastic enough to conform perfectly to the stamping-die surfaces and yet the material is not plastic enough to flow to a degree such that the thickness of the film or sheet is appreciably altered. The scratch noise level of records prepared using forming temperatures above the heat distortion temperature of the film material is lower than that of thin-film records prepared using temperatures lower than the heat distortion temperature.

While the practice of our invention results in an extremely thin record which rests flat upon the turntable during the playing process, we have found that the introduction of a static charge upon the rear surface of the disc results in the record clinging to the turntable even more tenaciously. The effect of such charge is to cause better driving friction forces between the table and the record as well as even better flatness characteristics. We have found that superior clinging characteristics between the film record and the turntable exist when the turntable is of metal. However, we have found that plastics or even textile surfaces give some improvement.

The surface structure of the turntable on which the record is played represents an area where some malperformance of the record may occur if certain precautions are not taken. We have found that the thin-film record will successfully bridge surfaces in which discontinuities of the order of 1/32" apart exist, if the film thickness is in excess of .001". Thinner films require turntable surfaces which are smoother.

To provide a smooth surface for the record to rest upon, we have developed a thin metal disc as a support. This disc rests upon the turntable surface and is driven by the frictional forces acting between it and the turntable as illustrated in FIG. 5. Static electrical charges on the thin-film record hold it to the metal disc and provide forces which cause it to be driven by the metal disc. We have found that other materials may be used as the driving disc, but we have found metal to be the preferred material.

In the above description when we refer to a soft plastic (core layer) we contemplate a material having hardness values within the range of D34 to D78 on durometer scale. The molecular weight and other properties of our preferred polyethylene and polypropylene are as follows: The plastic or wax should have a molecular weight greater than 3000. The material may be used supplied either in an amorphous or highly crystalline state. Co-polymers of the olefins are also successful in the application.

Rather than use non-oriented, or film oriented lengthwise other films may be used. A biaxially-oriented film of a polyester comprising the polymeric condensation product of terephthalic acid, isophthalic acid and 1,4-cyclohexanedimethanol in the molar proportions 5:1:6 was made by extrusion of a sheet, continuously stretching the sheet about threefold in the lengthwise direction and about threefold in the transverse direction, and subsequently heat setting the oriented film at a temperature above 200° C. may be used.

While several modifications have been described, there are other modifications which may be made. In the process of making the records rather than proceeding to coat the base with the soft plastic and then overcoat with the thin wearing layer, the following may be a more suitable method under certain circumstances. A preformed composite sheet may be prepared. For example, the thin wear resistant polyester plastic film is coated with the thicker polyolefin layer. Or this may be accomplished by extruding or laminating a polyolefin film onto the polyester thin film. Such composite film or polyester and polyolefin may be rolled up or otherwise stored until used. That is, a piece of this composite film intermediate product is placed over the desired base or support. Then by pressure, limited heat and use of stamper and the like as already explained an embossed record may be easily prepared. Such composite sheet is helpful and convenient for small manufacturers who do not have coating equipment. The composite sheet also has other uses.

Although the invention has been described in considerable detail with particular reference to certain preferred embodiments thereof, variations and modifications can be effected within the spirit and scope of the invention as described hereinabove, and as defined in the appended claims.

We claim:

1. A phonograph record formed by a stamper comprising a thin sheet of oriented polyester from the group consisting of poly(1,4-cyclohexylenedimethylene terephthalate) and copolyesters of 1,4-cyclohexylenedimethylene terephthalate-isophthalate, to provide a wear-resistant surface and a sound groove formed by a spiral fold in said thin sheet, the thickness of said sheet being essentially uniform and less than .003 inch so that the spiral fold is an accurate reproduction of the groove stamper.

2. The phonograph record of claim 1 wherein the thin sheet is carried on a soft plastic core, said core being thicker than the thin sheet, said thin sheet being adhered to said core.

3. The record of claim 1 wherein the thin sheet is adhered to a core comprised of polyolefin, said polyolefin being at least 10 times as thick as the thin sheet layer.

4. The record of claim 1 wherein said sheet is so chosen that its thickness is related to the groove dimension which are desired in a manner such that upon folding of the sheet the material will not be materially altered in thickness by the folding action of the stamper thereby providing a wear resistant information bearing surface of uniform cross section thickness capable of withstanding sharp folding and subsequent flattening without material detrimental effect upon the stabilized groove structure impressed in the sheet by the folding action of the stamper.

5. The record of claim 1 wherein said sheet being formed by the folding action of said stamper bearing against the thin sheet, said sheet being supported by a yielding blanket comprised of rubberlike material and possessing properties allowing transfer of heat through the blanket thereby permitting heat supplied by means provided in the stamper and blanket support to be transmitted to said thin polyester sheet in a degree such that the critical temperature required for stabilizing the biaxial orientation of the sheet is exceeded thus allowing the sheet to be folded to conform to the groove structure represented in the stamper whereupon cooling to a temperature lower than the critical stabilization temperature said structure is caused to be retained for life of the record in a manner such that it is materially unaffected by subsequent folding and normal mechanical handling.

References Cited by the Examiner

UNITED STATES PATENTS

| | | | |
|---|---|---|---|
| 1,146,389 | 7/1915 | Aylsworth | 18—48.5 |
| 1,446,289 | 2/1923 | Dessau | 274—39 |
| 1,946,596 | 2/1934 | Symonds | 274—42 |
| 2,004,400 | 6/1935 | Thomas | 18—48.3 |
| 2,094,280 | 9/1937 | Proctor | 274—42 |
| 2,106,623 | 1/1938 | Proctor et al. | 18—48.3 |
| 2,200,866 | 5/1940 | Thompson | 274—42 X |
| 2,200,918 | 5/1940 | Dunning et al. | 106—37 X |
| 2,559,786 | 7/1951 | Mueller | 274—39 |
| 2,846,230 | 8/1958 | Richter | 274—42 |
| 2,901,466 | 8/1959 | Kibler et al. | 260—75 |
| 2,999,772 | 9/1961 | Burk et al. | 117—138.8 |
| 3,140,095 | 7/1964 | Henry et al. | 274—42 |

FOREIGN PATENTS 584,862  11/1958  Italy.

NORTON ANSHER, *Primary Examiner.*

EVON C. BLUNK, *Examiner.*

WILLIAM E. JACKSON, CLIFFORD B. PRICE,
*Assistant Examiners.*